(12) United States Patent
Steinhauer (10) Patent No.: US 8,280,966 B2
(45) Date of Patent: Oct. 2, 2012

(54) SYSTEM AND METHOD OF CONTROLLING ACCESS TO INFORMATION IN A VIRTUAL COMPUTING ENVIRONMENT

(75) Inventor: Sebastian Steinhauer, Mountain View, CA (US)

(73) Assignee: SAP AG, Walldorf (DE)

( * ) Notice: Subject to any disclaimer, the term of this patent is extended or adjusted under 35 U.S.C. 154(b) by 369 days.

(21) Appl. No.: 12/604,137

(22) Filed: Oct. 22, 2009

(65) Prior Publication Data

US 2011/0099231 A1  Apr. 28, 2011

(51) Int. Cl.
G06F 15/16 (2006.01)
G06F 15/173 (2006.01)
G06F 9/455 (2006.01)

(52) U.S. Cl. .............. 709/206; 709/226; 718/1

(58) Field of Classification Search ............ None
See application file for complete search history.

(56) References Cited

U.S. PATENT DOCUMENTS

| | | | |
|---|---|---|---|
| 4,853,843 A | 8/1989 | Ecklund | |
| 5,682,532 A | 10/1997 | Remington et al. | |
| 6,173,404 B1 | 1/2001 | Colburn et al. | |
| 7,426,565 B1* | 9/2008 | Tormasov et al. | 709/229 |
| 7,457,918 B2 | 11/2008 | Marwinski et al. | |
| 7,739,121 B2 | 6/2010 | Jain et al. | |
| 7,792,801 B2 | 9/2010 | Hamilton et al. | |
| 7,933,956 B2* | 4/2011 | Hon et al. | 709/205 |
| 2001/0032314 A1 | 10/2001 | Ansper et al. | |
| 2002/0095463 A1* | 7/2002 | Matsuda | 709/205 |
| 2004/0255140 A1 | 12/2004 | Margolus et al. | |
| 2004/0268142 A1 | 12/2004 | Karjala et al. | |
| 2005/0015725 A1* | 1/2005 | Matsuda | 715/706 |
| 2005/0229258 A1 | 10/2005 | Pigin | |
| 2006/0174352 A1 | 8/2006 | Thibadeau | |
| 2006/0178968 A1 | 8/2006 | Jung et al. | |
| 2006/0218651 A1 | 9/2006 | Ginter et al. | |
| 2006/0220829 A1 | 10/2006 | Johnson | |
| 2006/0271691 A1 | 11/2006 | Jacobs et al. | |
| 2006/0282461 A1 | 12/2006 | Marinescu | |
| 2008/0109242 A1 | 5/2008 | Shear et al. | |
| 2008/0127304 A1 | 5/2008 | Ginter et al. | |
| 2009/0144148 A1 | 6/2009 | Jung et al. | |
| 2009/0210347 A1 | 8/2009 | Sarcanin | |
| 2009/0254422 A1 | 10/2009 | Jenkins et al. | |
| 2009/0271369 A1 | 10/2009 | Cheng et al. | |
| 2009/0287790 A1* | 11/2009 | Upton et al. | 709/208 |

(Continued)

OTHER PUBLICATIONS

James J. Odell, H. Van Dyke Parunak, Mitch Fleischer, and Sven Brueckner, Modeling Agents and their Environment. 2001 (ERIM CEC and James Odell).

(Continued)

*Primary Examiner* — Peling Shaw
*Assistant Examiner* — Thomas Richardson
(74) *Attorney, Agent, or Firm* — Fountainhead Law Group P.C.

(57) ABSTRACT

In one embodiment the present invention includes a method comprising specifying personal spaces in the virtual computing environment for first and second users and moving the personal spaces to encompass a virtual object, where the virtual object is associated with data on another system. A message is sent from a virtual server to one of the user's clients to access the data associated with the virtual object from the other system. Credentials necessary for accessing the data are stored on different user's clients, and the credentials are used to authenticate the user and perform the data access. The data associated with the virtual object may then be sent to the other user.

20 Claims, 7 Drawing Sheets

U.S. PATENT DOCUMENTS

| | | |
|---|---|---|
| 2009/0328171 A1 | 12/2009 | Bayus et al. |
| 2010/0114662 A1 | 5/2010 | Jung et al. |
| 2010/0146608 A1 | 6/2010 | Batie et al. |
| 2010/0161456 A1* | 6/2010 | Boss et al. .................. 705/30 |
| 2011/0107429 A1 | 5/2011 | Marilly et al. |

OTHER PUBLICATIONS

Robert Buderi, "Computing Goes Everywhere," Technology Review, Published by MIT, Jan. 2001.

* cited by examiner

SYSTEM AND METHOD OF CONTROLLING ACCESS TO INFORMATION IN A VIRTUAL COMPUTING ENVIRONMENT

BACKGROUND

The present invention relates to virtual computing, and in particular, to a system and method of controlling access to information in a virtual computing environment.

Figure 1:
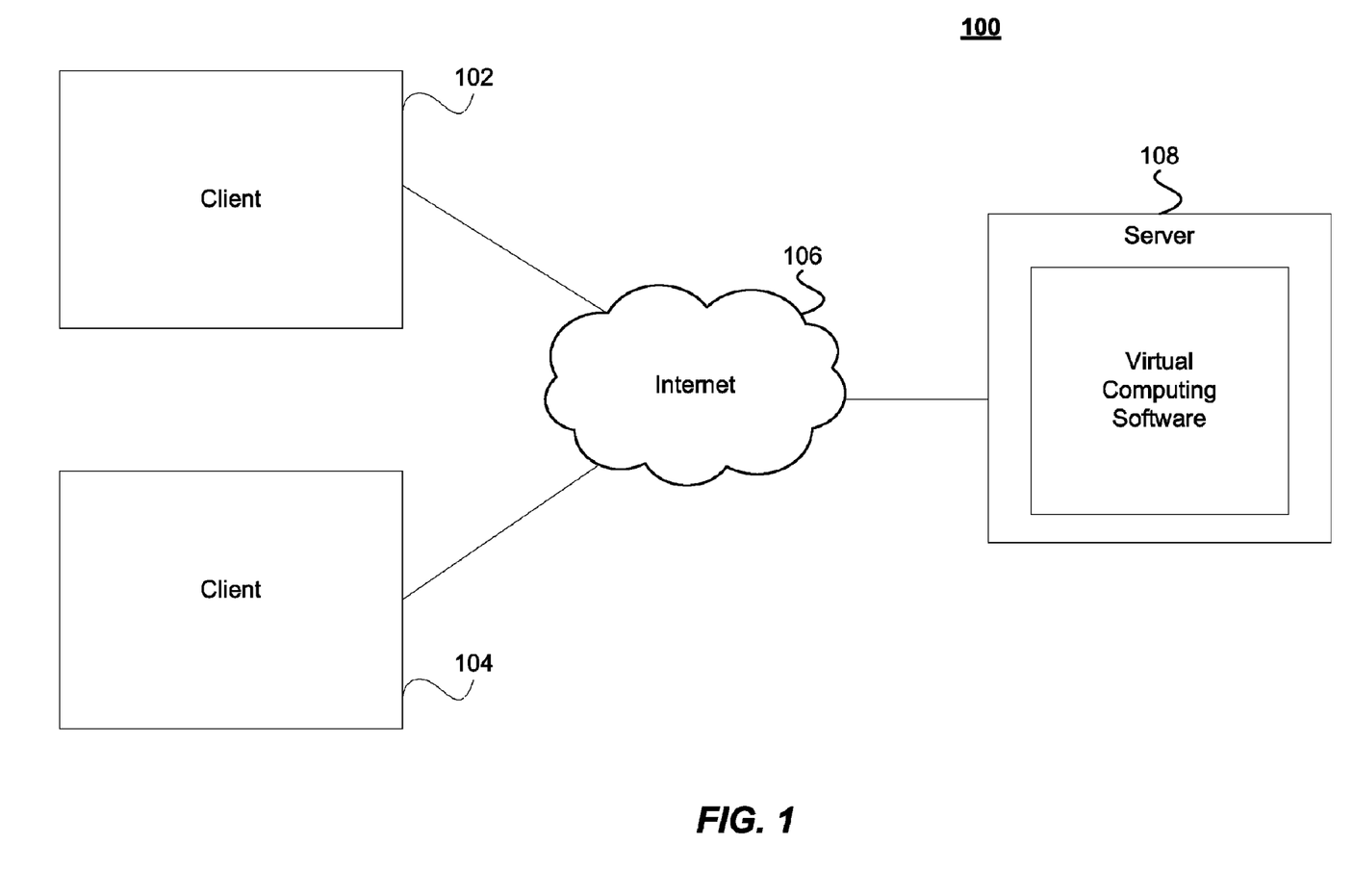
FIG. 1 illustrates a typical virtual computing environment.

A virtual computing environment is a computer-based simulated space, which may for example allow for multiple users to inhabit and interact using avatars. As used herein, the term virtual computing environment refers to virtual environments and virtual worlds implemented on computer systems. The term virtual computing environment, as used herein, does not refer to virtual machines such as virtual servers from VMware®, for example. Avatars are typically depicted as three-dimensional graphical representations of each user. Communication between users range from text, graphical icons, visual gesture, or sound. Users in a virtual computing environment often have personal spaces. Personal space may be defined as an invisible area surrounding a user which functions as a buffered comfort zone during interaction with other users. FIG. 1 illustrates a typical virtual computing environment. System 100 may include a client computer 102 and client computer 104. A software application that enables communication and interaction in the virtual world may be installed on client 102 and client 104. Clients 102 and 104 may access server 108 over the internet 106. Server 108 may include virtual computing software 110.

One problem in current virtual computing environments is controlling access to data or functionality associated with objects in a virtual computing environment (virtual objects). In a virtual world, it may be beneficial for users who have access to certain virtual objects to control access to such objects and the data or functionality associated with such objects. In a virtual computing environment, it may be desirable to share the data or functionality associated with objects with other users. However, there is currently no efficient mechanism for allowing users to limit access to objects and associated data in a virtual world by other users. Thus, it would be desirable to improved system and method of controlling access to information in a virtual computing environment.

SUMMARY

Embodiments of the present invention improve access to information in a virtual computing environment. In one embodiment the present invention includes a computer-implemented method of controlling access to information in a virtual computing environment comprising specifying, on a first computer system, a first personal space in the virtual computing environment for a first user, specifying, on the first computer system, a second personal space in the virtual computing environment for a second user, moving the first personal space, under control of the first user on a second computer system, to encompass a first virtual object in the virtual computing environment, wherein the first virtual object is associated with data on a third computer system, and wherein the second computer system stores a credential necessary for accessing said data by the first user on the third computer system, moving the second personal space, under control of the second user on a fourth computer system, to encompass the first virtual object in the virtual computing environment, sending a message from the first computer system to the second computer system when the first virtual object is encompassed within both the first and second personal spaces, accessing, in response to said message, said data associated with the first virtual object from the third computer system using the credential stored on the second computer system, and sending said data associated with the first virtual object from the third computer system to the fourth computer system for use by the second user.

In one embodiment, the data associated with the first virtual object is routed from the third computer system to the second computer system, from the second computer system to the first computer system, and from the first computer system to the fourth computer system.

In one embodiment, the request to retrieve said data associated with the first virtual object is only generated if the first virtual object is designated as shared.

In one embodiment, the first user designates the first virtual object as shared on the second computer system.

In one embodiment, the first virtual object is further associated with second data, and wherein the fourth computer system stores a second credential necessary for accessing said second data.

In one embodiment, the method further comprises sending a second message from the first computer system to the fourth computer system when the first virtual object is encompassed within both the first and second personal spaces, accessing, in response to said second message, said second data associated with the first virtual object using the second credential stored on the fourth computer system, and sending said second data associated with the first virtual object to the second computer system for use by the first user.

In one embodiment, the first and second users designate data associated with the first virtual object to be displayed simultaneously to both users.

In one embodiment, the second data is stored on the third computer system.

In one embodiment, the second data is stored on a fifth computer system.

In one embodiment, the third and fifth computer systems are part of an enterprise computer system.

In one embodiment, the first personal space comprises a geometric region in the virtual computing environment.

In one embodiment, the geometric region is a spherical region.

In one embodiment, an avatar is associated with the personal space, and the personal space is moved by moving the avatar.

In one embodiment, the personal space is a line of sight on a display.

In one embodiment, the first computer system includes a virtual server manager for controlling the virtual computing environment, the second computer system includes a first client system for interfacing with the virtual server manager, the third computer system includes an enterprise software application, and the fourth computer system includes a second client system for interfacing with the virtual server manager.

In another embodiment, the present invention includes a computer-readable medium containing instructions for controlling a computer system to perform a method, the method comprising specifying, on a first computer system, a first personal space in the virtual computing environment for a first user, specifying, on the first computer system, a second personal space in the virtual computing environment for a second user, moving the first personal space, under control of the first user on a second computer system, to encompass a first virtual object in the virtual computing environment, wherein the first virtual object is associated with data on a third computer system, and wherein the second computer system stores credentials necessary for accessing said data by the first user on the third computer system, moving the second personal space, under control of the second user on a fourth computer system, to encompass the first virtual object in the virtual computing environment, sending a message from the first computer system to the second computer system when the first virtual object is encompassed within both the first and second personal spaces, accessing, in response to said message, said data associated with the first virtual object from the third computer system using the credential stored on the second computer system, and sending said data associated with the first virtual object from the third computer system to the fourth computer system for use by the second user.

The following detailed description and accompanying drawings provide a better understanding of the nature and advantages of the present invention.

DETAILED DESCRIPTION

Described herein are techniques for use in a virtual computing environment. In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

Figure 2:
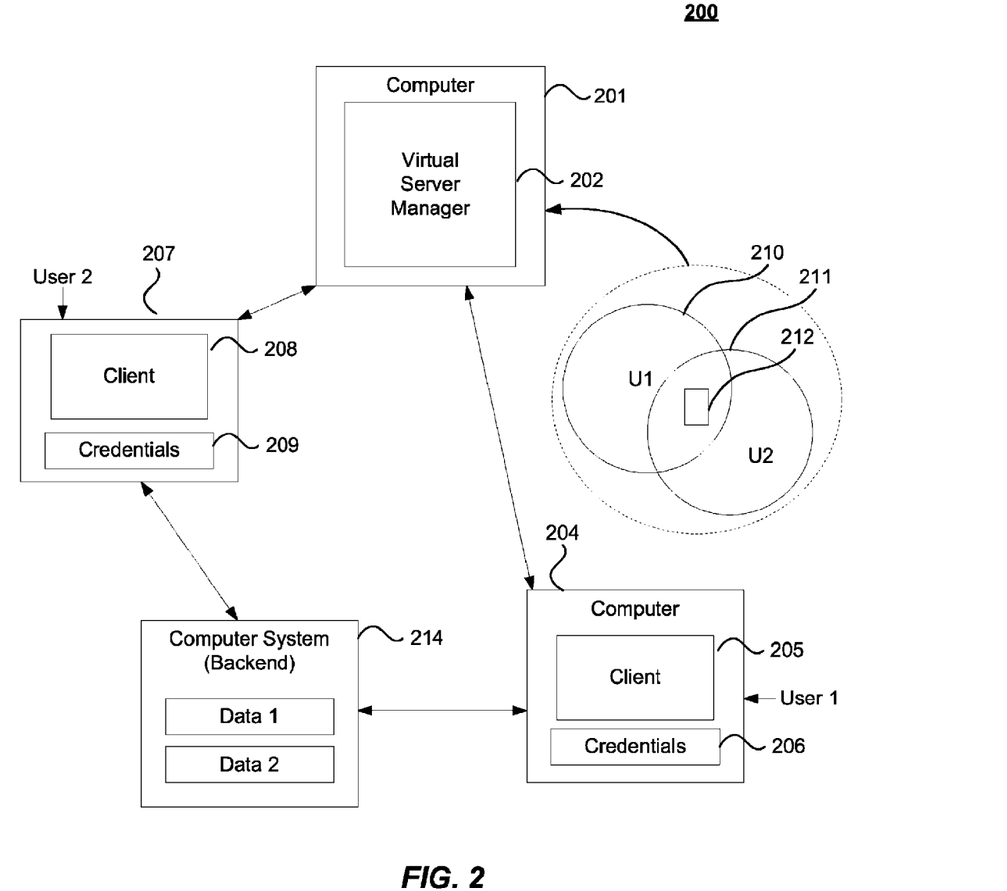
FIG. 2 illustrates an example virtual computing environment according to one embodiment of the present invention.

FIG. 2 is an example virtual computing environment 200 according to one embodiment of the present invention. Virtual computing environment 200 may include a computer simulated space that allows multiple users to move a representation of themselves ("avatars") around in the virtual world. Users of system 200 may share and exchange data or functionality of certain virtual objects in the space. System 200 may include a virtual server manager software component 202 running on a computer system 201. As used herein, a virtual server manager refers to the server software that creates and/or manages the virtual world. For example, it may manage the interactions of users, the avatars, or the virtual objects, for example. System 200 may also include another computer system 204 and computer system 207. Computer systems 204 and 207 may include client software components 205 and 208. Clients 205 and 208 may provide the interfaces for communication and interaction between users from computer systems 204 and 207 and the virtual server manager 202 on computer system 201. Clients 205 and 208 may also enable users of computer systems 204 and 207 to manage their virtual personal spaces in the virtual computing environment. For example, a user of computer system 204 (User 1) may specify a personal space 210, and a user of computer system 207 (User 2) may also specify a personal space 211. User 1 and User 2 interface with the virtual server manager 202 through clients 205 and 208, respectively, and thereby are able to interact with each other, other users, and virtual objects in the virtual world, for example.

Features and advantages of the present invention allow a user in a virtual computing environment to be able to control access to features of a virtual object 212. Generally, a virtual object 212 may be associated with data or functionality supported by another remote computer system, such as computer system 214. In one embodiment described in more detail below, the virtual object is an enterprise virtual object that has corresponding data and functionality in an enterprise computing system, for example. In some embodiments, there may be one or more enterprise objects included in a virtual computing environment, and the virtual computing environment may be linked to an enterprise computing system to allow users to manipulate objects using a virtual environment as described in more detail below. Accordingly, computer system 214 may be a backend system, for example, that is part of the enterprise computing system (e.g., a backend database or application such as ERP, CRM, or other data source).

Generally, User 1 on computer system 204 may move personal space 210 to encompass object 212 in the virtual computing environment. Object 212 may be associated with data on computer system 214 (e.g., Data 1). Before a request for the data can be accessed from computer system 214, the user's credentials may be verified. Computer system 204 includes stored credentials 206 necessary for accessing data by the user on computer system 214. Credentials 206 may include a user name and password, for example, or other forms of authentication information that may be used by computer system 214 to authenticate a user, and thereby determine if a particular user has permission rights to access data or functionality associated with object 212. Once User 1's credentials have been verified by computer system 214, computer system 204 may access the data or functionality that is associated with virtual object 212 from computer system 214.

In another example, User 2 on computer system 207 may move a second personal space 211 to also encompass enterprise object 212 in the virtual computing environment. Thus, object 212 may be encompassed by both personal space 210 and personal space 211. User 1 of computer system 204 may have designated the object 212 as a shared object, thereby allowing some or all of the features associated with virtual object 212 that are available on computer 214 (e.g., Data 1) to be shared with User 2. When the personal spaces 211 and 212 both encompass object 212, virtual server manager 202 on computer system 201 may send a message to client 205 on computer system 204 to access data associated with object 212 to be shared with User 2, for example. The message may further notify User 1 that object 212 has been encompassed by a second personal space. In response to the message, computer system 204 may use stored credentials 206 to access data associated with object 212 from computer system 214. For example, in response to the message received from virtual server manager 202 on computer 201, client 205 on computer 204 may generate a request for data associated with object 212. The request for data may be sent to computer 214, and the request may include credentials 206 that are required to access the data, for example. Once User 1's credentials have been verified by computer system 214, computer system 204 may access the data (e.g., Data 1) that is associated with object 212 on computer system 214 to the extent permitted by credentials 206 (e.g., different users may have different access rights with different scopes to different data and different functionality). Accessed data, for example, may be sent from computer system 214 to client 205 on computer system 204 in the form of a response. Accordingly, client 205 on computer 204 may receive the response from computer 214 and automatically route the response to virtual server manager 202 on computer system 201. If object 212 is designated as a shared object, virtual server manager 202 on computer system 201 may then route the data to User 2 on computer system 207. Virtual server manager 202 may also route the data to User 1 on computer system 202 as part of a data update. If object 212 is not designated as a shared object, User 2 may not access the data associated with it.

In another embodiment, enterprise object 212 may be further associated with second data or functionality (e.g., Data 2) on computer system 214 that are within the scope of permissions for User 2 but not User 1. Accordingly, computer system 207 may store credentials 209 that may be used to access Data 2, for example. If object 212 is encompassed by both personal space 210 and personal space 211, then virtual server manager 202 may send a message to computer system 207 to access Data 2. In response to this message, computer system 207 may use stored credentials 209 to access data associated with object 212 on computer system 214 (e.g., Data 2). Once User 2's credentials have been verified, computer system 207 may access Data 2 that is associated with object 212 from computer system 214. Accordingly, once computer system 207 retrieves Data 2 from computer system 214, it may route the data to virtual server manager 202 on computer system 201. To share the data, virtual server manager 202 may then route the data to User 1 on computer system 204.

Features and advantages of the present invention include interactive communication between users when personal spaces encompass a virtual object at the same time. For example, User 1 and User 2 of personal spaces 210 and 211, respectively, may communicate with one another to designate which data to retrieve and share. For example, if two different users have two different authorization rights to the same virtual object, then the users may collaboratively share data, graphics, or other functionality that one user has but the other does not. Communication in the virtual environment may be provided to allow such collaboration. For example, communication may include a telephone conference, electronic mail, instant messaging, or another integrated messaging system included in the virtual server manager 202, for example. In one example, enterprise object 212 may be associated with number of user vacation days stored in a backend computer system 214. When the personal spaces of both User 1 and User 2 encompass object 212, then a messaging feature may be automatically enabled to allow User 2 to request access to User 1's vacation information (e.g., if the two users want to coordinate a business trip with a vacation). If User 1 agrees to share User 1's vacation data with User 2, then object 212 may show User 1's vacation days to both users. If User 2 agrees to share User 2's vacation data with User 1, then object 212 may show User 2's vacation days to both users. If both users share access to their vacation data, then both users may view each others' vacation data. The vacation data may reside on a different computer system running a different software system.

Figure 3:
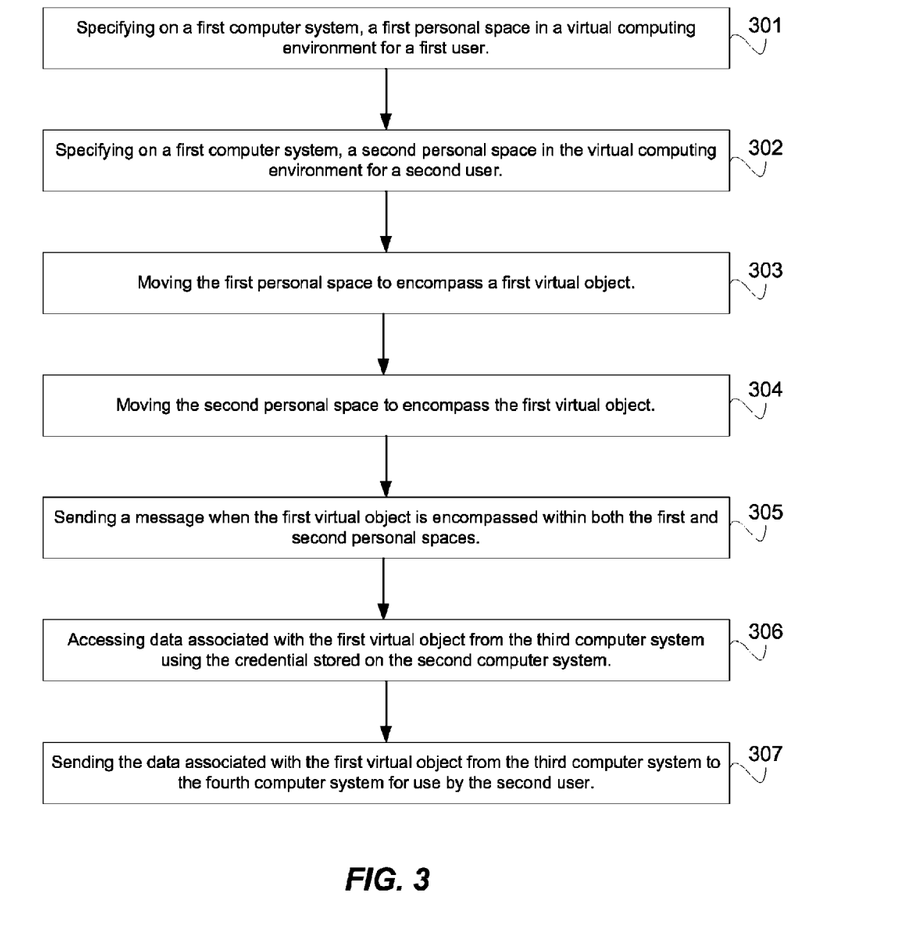
FIG. 3 illustrates a method for use in a virtual computing environment according to one embodiment of the present invention.

FIG. 3 illustrates an example of accessing data in a virtual computing environment according to one embodiment of the present invention. The present example illustrates the steps in controlling access to data in a virtual computing environment. At 301, a first user specifies a first personal space in a virtual computing environment on a first computer system. The first computer system may be one or more computers executing virtual server manager software, for example. At 302, a second user specifies a second personal space in the virtual computing environment on the first computer system. There may be a plurality of users specifying additional personal spaces. Users may have access to virtual objects (e.g., virtual enterprise objects) that may be included in a virtual computing environment. Virtual enterprise objects may be objects displayed in the virtual environment that may be used to trigger actions in backend computer systems, such as data access or data visualization routines, for example. The virtual objects may be associated with data stored on a third computer system, for example. At 303, the first personal space is moved to encompass a first virtual object. For instance, the first user may control the first personal space from a second computer system that is remote from the first computer system. The first user may access the data that the virtual object is associated with from a third computer system (e.g., a backend system) as described below using a credential stored on the second computer system, which is necessary for accessing the data. At 304, the second personal space may be moved to encompass the first virtual object. For example, the second personal space may be moved under control of the second user on a fourth computer system. At 305, a message may be sent from the first computer system to the second computer system. For example, when the first virtual object is encompassed within both the first and second personal spaces a message may be triggered to access data or functionality from the third computer system. At 306, in response the message, data associated with the first virtual object may be accessed from the third computer system using the credential stored on the second computer system. At 307, the data associated with the first virtual object is sent from the third computer system to the fourth computer system for use by the second user.

Figure 4A:
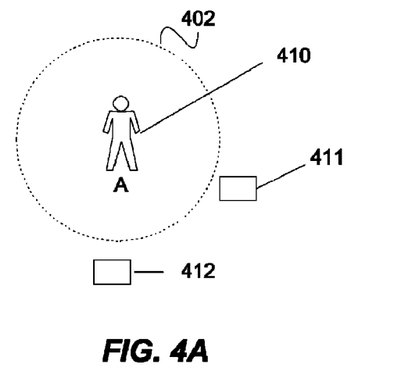
FIGS. 4A-B illustrate an example of accessing data in a virtual computing environment according to one embodiment of the present invention.
Figure 4B:
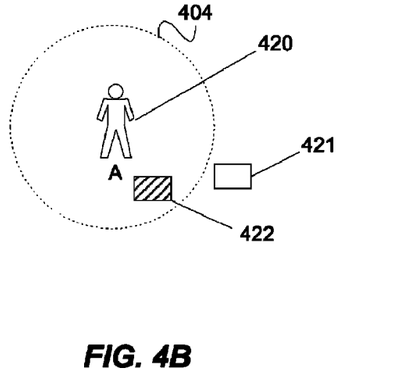

FIGS. 4A-B illustrates an example of accessing data in a virtual computing environment according to one embodiment of the present invention. The relative location of avatars and their personal spaces may impact the behaviors of enterprise objects. Personal spaces may surround a user's avatar or define a region in a virtual environment within which virtual objects or other avatars may have a different status, for example. Personal spaces may move through the virtual environment under control of the user, and as virtual objects or other avatars come into contact with the personal space, certain predefined functions may be performed by the virtual server software and/or clients to indicate the change in status and, for example, access data or functionality as described above. For example, personal space 402 for avatar A 410 does not encompass any enterprise objects (e.g., enterprise objects 411 and 412). Since there are no enterprise objects within personal space 402, it will not retrieve and reflect data to user A. However, personal space 404 for avatar A 420 encompasses enterprise object 422 in the virtual computing environment. Since enterprise object 422 is within personal space 404, it may retrieve and show the data that is available to the user of avatar A. Enterprise object 421 is outside personal space 404 and remains inactive.

Figure 5A:
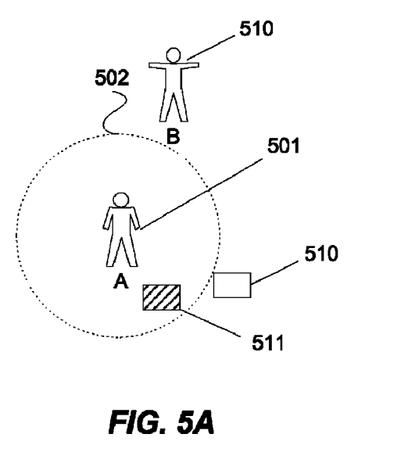
FIGS. 5A-B illustrate another example of controlling access to data in a virtual computing environment according to one embodiment of the present invention.
Figure 5B:
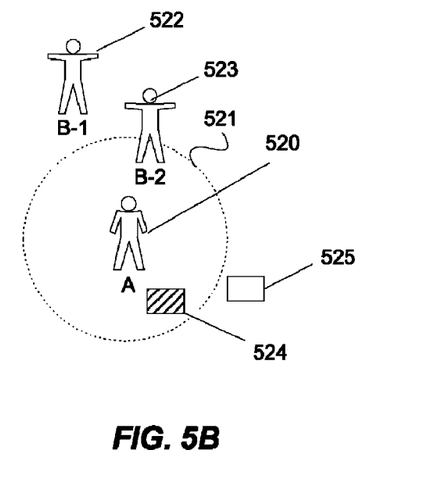

FIGS. 5A-B illustrates another example of controlling access to data in a virtual computing environment according to one embodiment of the present invention. The owner of a personal space may utilize different methods to control access to the space. At 502, avatar B 510 approaches the personal space belonging to avatar A 501. The initial communication to gain access to the space begins here. There may be one or more responses returned by avatar A. Avatar B 510 may be granted access to an active object 511 if avatar A 501 grants avatar B 510 permission to enter personal space 502. In one example in FIG. 5B, avatar A 520 has denied access to avatar B-1 522. Avatar B-1 may not physically move into personal space 521 of avatar A. In another example, avatar A has granted access to avatar B-2 523. Avatar B-2 is allowed to enter the space. Avatar B-2 can now access the shared data associated with enterprise object 524, which is active because it is inside Avatar A's personal space. However, in some embodiments, entry into a personal space does not automatically grant access to data associated with an enterprise object. For example, avatar A may grant access to A's personal space to avatar B-2. Avatar B-2 may physically enter the personal space, but may not have access to any shared data.

Figure 6:
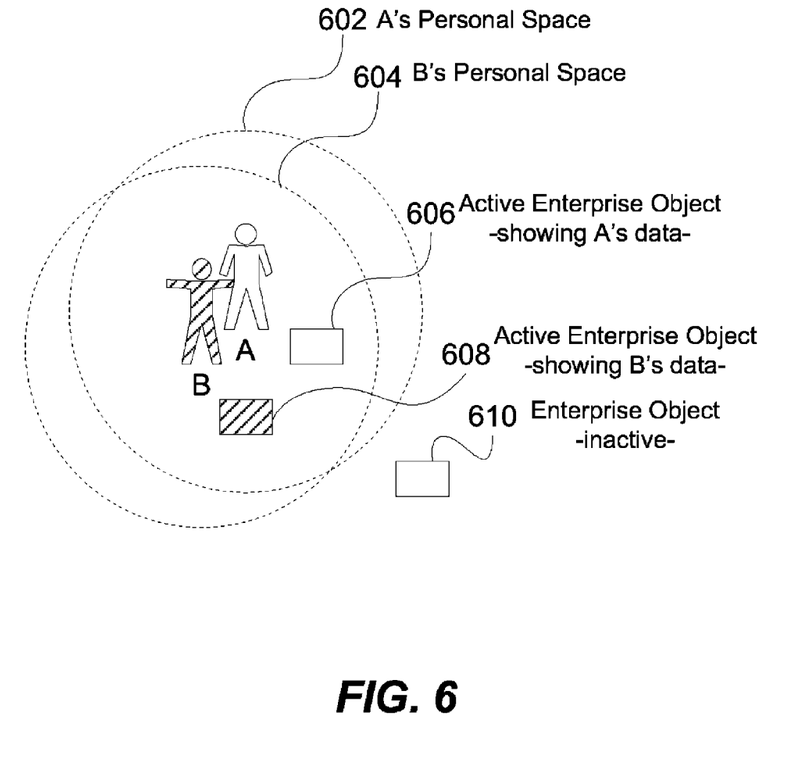
FIG. 6 illustrates another example of controlling access to data in virtual a computing environment according to one embodiment of the present invention.

FIG. 6 illustrates another example of controlling access to data in a virtual computing environment according to one embodiment of the present invention. In some instances, two personal spaces may overlap. This may affect the behaviors of any virtual objects that are encompassed within the overlapped spaces. For example, personal space 602 overlaps with personal space 604. Virtual object 606 may be located within an overlapping zone of personal spaces 602 and 604. Virtual object 608 may also be located within an overlapping zone of personal spaces 602 and 604. Virtual objects 606 and 608 may show the data belonging to one user at a time, for example. User A and user B may communicate with one another to decide which data the objects will represent (e.g., whose data each virtual object will show). For example, users A and B may decide that both virtual objects 606 and 608 may show user A's data first. In another example, users A and B may decide that both virtual objects 606 and 608 may show user B's data first. In one example, virtual object 606 may be associated with number of vacation days for users. User A and user B agree that virtual object 606 may show user A's vacation days first. Both User A and user B may have access to user A's data. Once user A and personal space 602 moves away from virtual object 606, it will show the data that belongs to user B or the nearest user. If there are no other users close to the object, virtual object 606 may return to an inactive state. In another example, object 608 may be associated with wages and withholdings data for users. User A and user B agree that virtual object 608 may show user B's wages and withholdings data first. Both User A and user B may have access to user B's data. Once user B and personal space 604 moves away from virtual object 608, it will show the data that belongs to user A or the nearest user. If there are no other users close to the object, virtual object 608 may return to an inactive state.

Personal spaces may vary according to different implementations. A personal space may be limited by surrounding objects. Like in real life, it is not enough to limit the personal space by its simple physical shape (e.g. a sphere). Personal spaces may be limited in areas behind walls which may be "out of sight" of the avatar, for example. However, a personal space may be defined as a configurable shape, a line of sight, or as a combination thereof on a display, for example. A personal space may even be the avatar itself.

Figure 7:
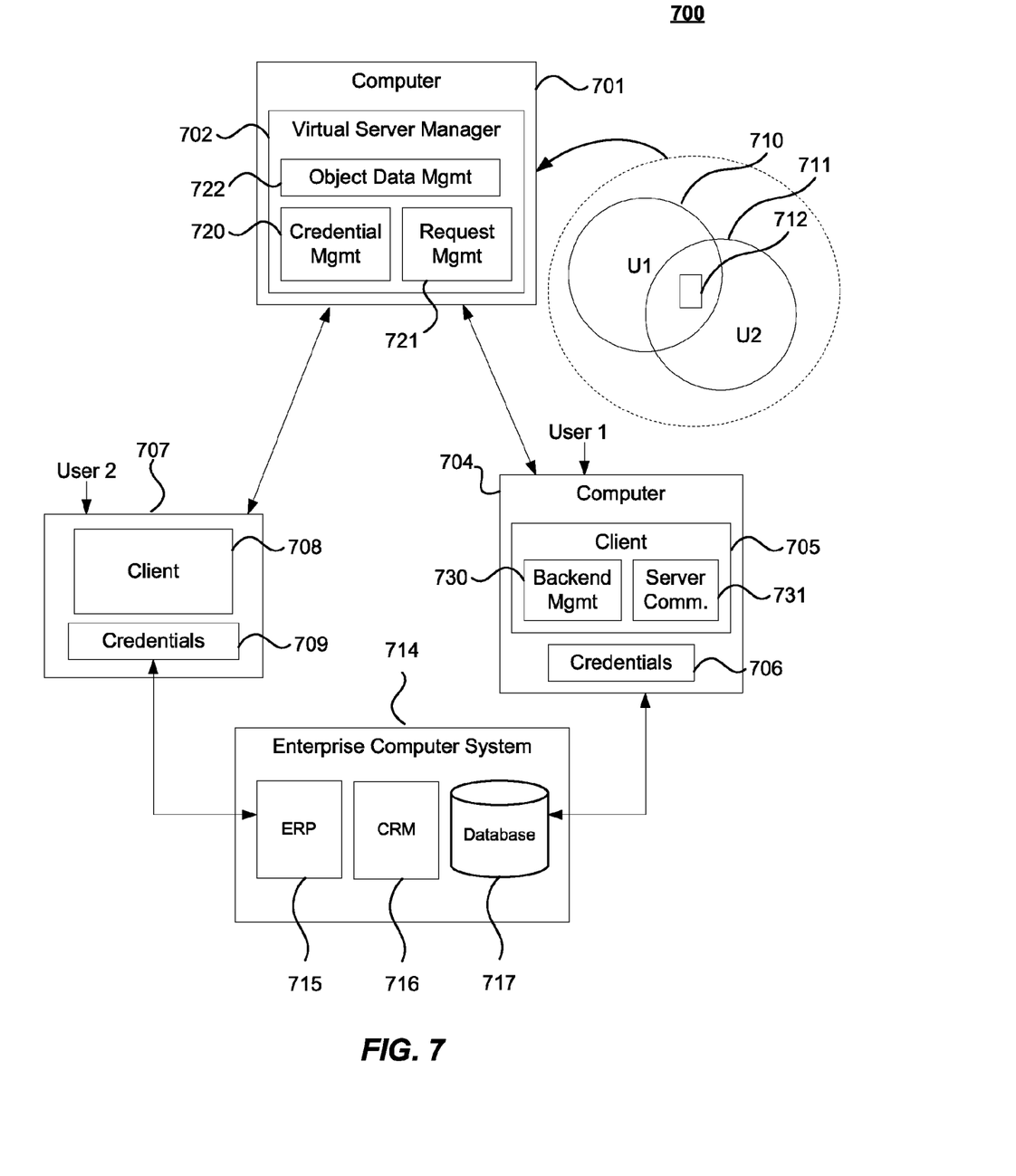
FIG. 7 illustrates an example of a virtual computing environment used to interface with an enterprise computer system according to another embodiment of the present invention.

FIG. 7 illustrates an example of a virtual computing environment used to interface with an enterprise computer system according to another embodiment of the present invention. In this example, virtual computing environment 700 is a client-server system. Virtual computing environment 700 includes a virtual server manager 702 executing on a first computer system 701. Multiple users may interact with each other in the virtual environment through clients, which may be remote from the server. In this example, a first user ("User 1") interacts with the virtual environment through client 705 executing on computer 704. Similarly, a second user ("User 2") interacts with the virtual environment through client 708 executing on computer 707. In this example, the virtual computing environment may be used to allow multiple users to interact with virtual objects linked to different aspects of objects in an enterprise computer system or other backend system. For example, interaction with virtual objects by users in the virtual computing environment may trigger corresponding actions in backend systems resulting in execution of algorithms or accessing and/or visualizing data stored in a backend system.

In this example, the virtual server manager 702 accesses data and functionality on an enterprise computer system 714 through clients 705 and 708. Enterprise computer system 714 may include an ERP software system 715, CRM software system 716, and one or more databases 717, for example. In this example, each user of the virtual computing environment 700 is authenticated to use backend systems. For example, SAP systems may use SECUDE PSE Management, MS windows in general provides a central certificate store, while MacOS provides the user a "Keychain". Accordingly, each user's client system includes credentials that allow the user to be authenticated on the enterprise computer system 714. In particular, computer 704 may include credentials 706 to authenticate User 1. Similarly, computer 707 may include credentials 709 to authenticate User 2. Advantages of this example embodiment ensure security because the users credentials do not leave the users machine to prevent identify theft. In order to ensure this, and provide access to enterprise systems, the actual access to the enterprise system is realized by the client software on each user's machine, using the credentials already available on the user's computer. As illustrated further below, objects in each user's personal space only get updated with the data collected from the corresponding backend system, while the user's credentials never leave the user's computer. This approach does not require any credentials to be stored on a virtual server manager 702 or any other central virtual world server, where they might be subject to misuse or theft.

As mentioned above, User 1 and User 2 may create avatars of themselves and manipulate virtual objects in the virtual world. The avatars may be surrounded by personal spaces, and the overlap of personal spaces may be used to share information between users. In this example, User 1 has a personal space 710 and User 2 has a personal space 711. Additionally, a virtual object 712 is within User 1's personal space. A personal space may be seen as an invisible or transparent object surrounding a user's avatar, for example. The attributes of a collision may be configurable. If an abstract collision detection shape exists surrounding the user's avatar representing a personal space (e.g., a virtual space collider), it can be used to detect overlap or intersection between two different personal spaces or virtual objects within a virtual world. When the spaces collide, certain actions may be triggered. Similarly, the physical interaction of the personal space collider with any object in the virtual world can be used to trigger one or more specified behaviors assigned to an object (switching on lights, showing data, opening doors, or executing a variety of backend system operations).

In this example, if User 2 moves personal space 711 such that virtual object 712 is within both users personal spaces, then a call may be triggered in the virtual server manager indicating that an interaction with virtual object 712 has occurred. In this example, virtual server manager 702 includes a request management software component 721 and a credential management software component 720. Credential management component 720 may identify which clients currently sponsor credentials for which objects. For example, virtual server manager 702 may associate particular virtual objects with particular client systems and or users, and this information may be stored and accessed when a particular object is activated by one or more personal spaces. Accordingly, a call generated in response to a user moving a personal space over an object in the personal space of another user may cause the credential component 720 to access the client associated with the object. Request management component 721 may forward requests to specified clients. In this example, request component 721 may forward a request to a client output by credential component 720, for example. Here, since User 2 moved personal space 711 over object 712 in personal space 710, the credential component 720 may produce client 705, and therefore, request component 721 forwards a request to client 705.

Client 705 may include a backend management software component 730 to receive, execute, and route requests from virtual server manager 702 to enterprise computer system 714. As mentioned above, client 705 includes credentials 706. When a request is received from virtual server manager 702, receipt and evaluation of the request causes client 705 to access and send credentials 706 to enterprise system 714 with another request. As mentioned above, requests to backend systems may be to access particular data and/or perform functions or execute algorithms implemented by enterprise system 714 (e.g., a database query on database 717). The enterprise system 714 uses the credentials to authenticate the request. If User 1 is authorized to access some or all of the data and/or functionality associated with the virtual object 712 in the enterprise system 714, where User 1's authorization is reflected and stored in the credentials, enterprise system 714 authorizes the request and returns the desired results. Client 705 further includes a server communications software component 731. When enterprise system 714 returns the desired results, server communication component 731 routes the results to the virtual server manager 702. Virtual server manager 702 may include a object data management software component 722. Object data management component 722 may identify valid recipients of results from the backend request. For example, object data management component 722 may identify client 705 as one of the recipients of data associated with virtual object 712 in response to User 2 moving personal space 711 over object 712 and triggering the data access request described above. Further, if both User 1 and User 2 need to be updated (e.g., if the two users are interactively accessing different data and functionality on enterprise computer system 714 that is associated with object 712), then both users may receive data updates. It is to be understood that data and functionality available only to User 2 on enterprise computer system 714 may be shared with User 1 in a similar manner as described above. Accordingly, if two or more users share an object in a personal space, the data collected by each of the user's clients is sent to the managing server, which determines which updates need to be sent to which users. Hereby, again no credentials need to be known to the managing server instance.

Figure 8:
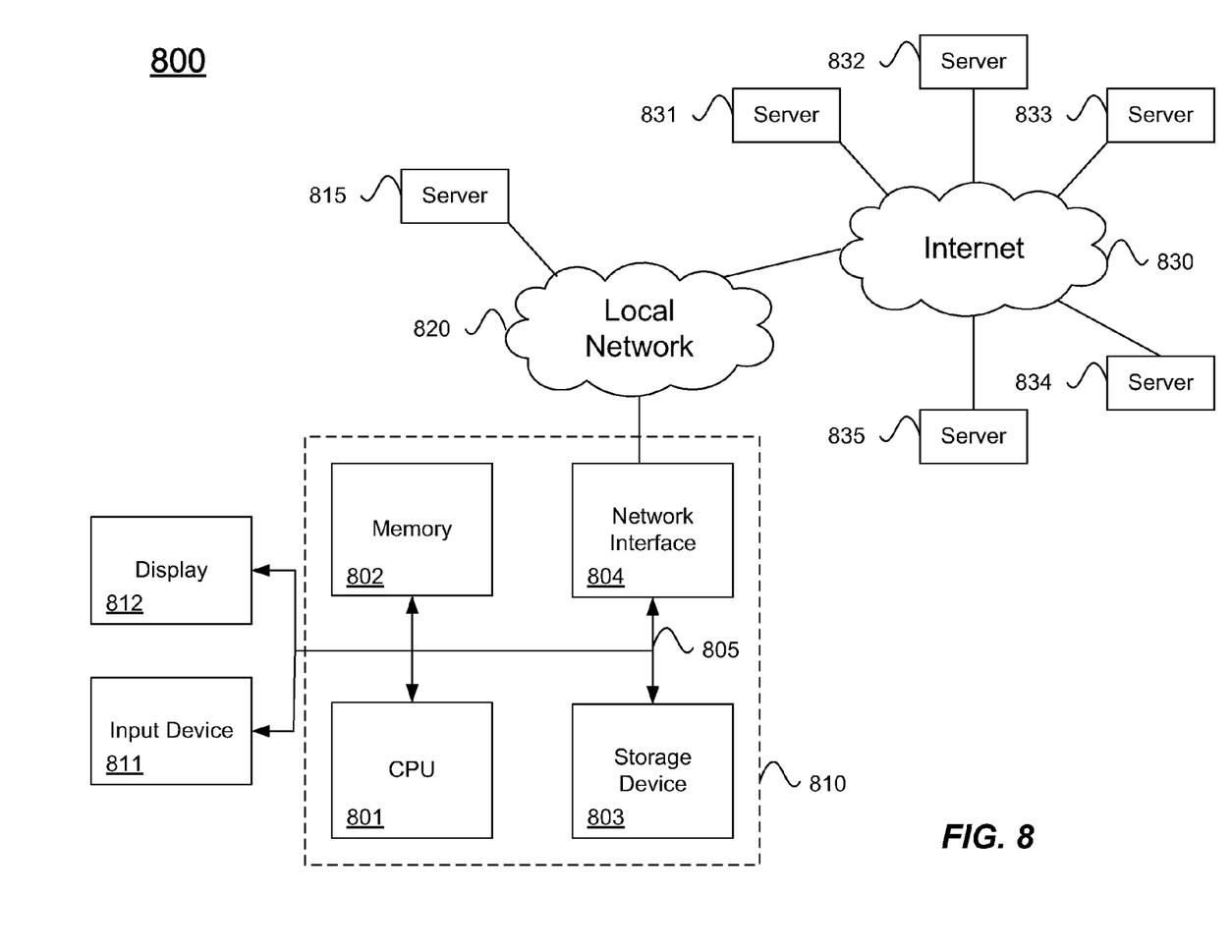
FIG. 8 illustrates a simplified diagram of a hardware system for implementing processes according to one embodiment of the present invention.

FIG. 8 illustrates a simplified diagram of a hardware system for implementing processes according to one embodiment of the present invention. Computer system 810 includes one or more buses 805 or other communication mechanism for communicating information, and one or more central processing units ("CPUs" or "processors") 801 coupled with bus 805 for processing information. The central processing unit may be configured to perform the functions described above and may be the means for performing the functions described above. Computer system 810 also includes one or more memories 802 coupled to bus 805 for storing information and instructions to be executed by processors 801, including information and instructions for performing the techniques described above, for example. This memory may also be used for storing variables or other intermediate information during execution of instructions to be executed by processor 801. Possible implementations of this memory may be, but are not limited to, random access memory (RAM), read only memory (ROM), or both. A storage device 803 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 803 may include source code, binary code, or software files for performing the techniques or embodying the constructs above, for example.

Computer system 810 may be coupled via bus 805 to an output device such as a display 812, such as a cathode ray tube (CRT) or liquid crystal display (LCD), for displaying information to a computer user. An input device 811 such as a keyboard and/or mouse is coupled to bus 805 for communicating information and command selections from the user to processor 801. The combination of these components allows the user to communicate with the system. In some systems, bus 805 may be divided into multiple specialized buses.

Computer system 810 also includes a network interface 804 coupled with bus 805. Network interface 804 may provide two-way data communication between computer system 810 and the local network 820. The network interface 804 may be a digital subscriber line (DSL) or a modem to provide data communication connection over a telephone line, for example. Another example of the network interface is a local area network (LAN) card to provide a data communication connection to a compatible LAN. Wireless links using radio frequency communications are another example. In any such implementation, network interface 804 sends and receives electrical, electromagnetic, or optical signals that carry digital data streams representing various types of information.

Computer system 810 can send and receive information, including messages or other interface actions, through the network interface 804 to an Intranet or the Internet 830. In the Internet example, software components or services may reside on multiple different computer systems 810, 815, or servers 831-835 across a local or wide area network such as the Internet. Some of the processes described above may be implemented on one or more servers, for example. A server 831 may transmit actions or messages from one component, through Internet 830, local network 820, and network interface 804 to a component on computer system 810. Different processes may be implemented on any computer system and send and/or receive information across a network, for example. In one embodiment, the techniques describe above may be implemented by software executing on one or more client and server computers 810, 815, and 831-835, for example.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A computer-implemented method of controlling access to information in a virtual computing environment comprising:
    specifying, on a first computer system, a first avatar in the virtual computing environment representative of a first user, the first avatar having a first personal space defined by a volume of space unique to and surrounding the first avatar;
    specifying, on the first computer system, a second avatar in the virtual computing environment representative of a second user, the second avatar having a second personal space defined by a volume of space unique to and surrounding the second avatar;
    moving the first personal space, under control of the first user on a second computer system, to encompass a first virtual object in the virtual computing environment, wherein the first virtual object is associated with data on a third computer system, and wherein the second computer system stores a credential necessary for accessing said data by the first user on the third computer system;
    moving the second personal space, under control of the second user on a fourth computer system, to encompass the first virtual object in the virtual computing environment;
    sending a message from the first computer system to the second computer system when the first virtual object is encompassed within both the first and second personal spaces;
    accessing, in response to said message, said data associated with the first virtual object from the third computer system using the credential stored on the second computer system; and
    sending said data associated with the first virtual object from the third computer system to the fourth computer system for use by the second user.

2. The method of claim 1 wherein said data associated with the first virtual object is routed from the third computer system to the second computer system, from the second computer system to the first computer system, and from the first computer system to the fourth computer system.

3. The method of claim 1 wherein said request to retrieve said data associated with the first virtual object is only generated if the first virtual object is designated as shared.

4. The method of claim 3 wherein the first user designates the first virtual object as shared on the second computer system.

5. The method of claim 1 wherein the first virtual object is further associated with second data, and wherein the fourth computer system stores a second credential necessary for accessing said second data.

6. The method of claim 5 further comprising:
    sending a second message from the first computer system to the fourth computer system when the first virtual object is encompassed within both the first and second personal spaces;
    accessing, in response to said second message, said second data associated with the first virtual object using the second credential stored on the fourth computer system; and
    sending said second data associated with the first virtual object to the second computer system for use by the first user.

7. The method of claim 6 wherein the first and second users designate data associated with the first virtual object to be displayed simultaneously to both users.

8. The method of claim 5 wherein the second data is stored on the third computer system.

9. The method of claim 5 wherein the second data is stored on a fifth computer system.

10. The method of claim 9 wherein the third and fifth computer systems are part of an enterprise computer system.

11. The method of claim 1 wherein the first personal space comprises a geometric region in the virtual computing environment.

12. The method of claim 11 wherein the geometric region is a spherical region.

13. The method of claim 1 wherein an avatar is associated with the personal space, and where the personal space is moved by moving the avatar.

14. The method of claim 1 wherein the personal space is a line of sight on a display.

15. The method of claim 1 wherein the first computer system includes a virtual server manager for controlling the virtual computing environment, the second computer system includes a first client system for interfacing with the virtual server manager, the third computer system includes an enterprise software application, and the fourth computer system includes a second client system for interfacing with the virtual server manager.

16. A non-transitory computer-readable medium containing instructions for controlling a computer system to perform a method, the method comprising:
    specifying, on a first computer system, a first avatar in the virtual computing environment representative of a first user, the first avatar having a first personal space defined by a volume of space unique to and surrounding the first avatar;
    specifying, on the first computer system, a second avatar in the virtual computing environment representative of a second user, the second avatar having a second personal space defined by a volume of space unique to and surrounding the second avatar;
    moving the first personal space, under control of the first user on a second computer system, to encompass a first virtual object in the virtual computing environment, wherein the first virtual object is associated with data on a third computer system, and wherein the second computer system stores credentials necessary for accessing said data by the first user on the third computer system;
    moving the second personal space, under control of the second user on a fourth computer system, to encompass the first virtual object in the virtual computing environment;
    sending a message from the first computer system to the second computer system when the first virtual object is encompassed within both the first and second personal spaces;
    accessing, in response to said message, said data associated with the first virtual object from the third computer system using the credential stored on the second computer system; and
    sending said data associated with the first virtual object from the third computer system to the fourth computer system for use by the second user.

17. The non-transitory computer-readable medium of claim 16 wherein said data associated with the first virtual object is routed from the third computer system to the second computer system, from the second computer system to the first computer system, and from the first computer system to the fourth computer system.

18. The non-transitory computer-readable medium of claim 16 wherein said request to retrieve said data associated with the first virtual object is only generated if the first virtual object is designated as shared.

19. The non-transitory computer-readable medium of claim 18 wherein the first user designates the first virtual object as shared on the second computer system.

20. The non-transitory computer-readable medium of claim 16 wherein the first virtual object is further associated with second data, and wherein the fourth computer system stores credentials necessary for accessing said second data, and wherein the method further comprises:
    sending a second message from the first computer system to the fourth computer system when the first virtual object is encompassed within both the first and second personal spaces;
    accessing, in response to said second message, said second data associated with the first virtual object; and
    sending said second data associated with the first virtual object to the second computer system for use by the first user.

* * * * *